United States Patent [19]

Hallock

[11] 4,193,333

[45] Mar. 18, 1980

[54] NON-SLOTTED CLINCH TYPE NAIL

[76] Inventor: Robert L. Hallock, 7136 NE. 8th Dr., Boca Raton, Fla. 33431

[21] Appl. No.: 932,074

[22] Filed: Aug. 8, 1978

[51] Int. Cl.² ............................................. F16B 15/00
[52] U.S. Cl. .................................... 85/31; 151/41.73
[58] Field of Search ................. 85/30, 31, 10 E, 9 R, 85/26, 1 P; 151/41.73, 41.72; 29/432

[56] References Cited

U.S. PATENT DOCUMENTS

| | | | |
|---|---|---|---|
| 1,349,183 | 8/1920 | Anderson | 85/30 X |
| 3,095,777 | 7/1963 | Hallock | 85/31 |
| 3,555,957 | 1/1971 | Hermle et al. | 85/10 E |
| 3,699,636 | 10/1972 | Walker | 29/432 |
| 3,871,264 | 3/1975 | Hallock | 85/30 |
| 4,003,286 | 1/1977 | Hallock | 85/31 |
| 4,004,483 | 1/1977 | Hallock | 85/10 E |

Primary Examiner—Ramon S. Britts

[57] ABSTRACT

A nail or fastener including a shank having a hollow penetrating portion with a continuous circular blunt end of predetermined width which can be driven into a relatively thick structural metallic member. The penetrating portion of the nail is of a configuration and hardness such that the circular blunt end crimps inwardly to capture a plug of material within the hollow penetrating portion and such plug of material remains joined to the metallic member so as to resist withdrawal of the nail.

10 Claims, 7 Drawing Figures

NON-SLOTTED CLINCH TYPE NAIL

BACKGROUND OF THE INVENTION

1. Field of the Invention.

This invention relates generally to fasteners of various kinds and relates particularly to a hardened nail having a penetrating portion that may be driven into a structural metallic member and a portion of the nail deforms to attach the nail to the member in a manner to resist withdrawal.

2. Description of the Prior Art.

In the past many efforts have been made to provide fasteners such as nails, screws, rivets and the like which could be driven, screwed or inserted into openings in a base material. Most of these prior art fasteners retain their shape with the exception of rivets in which one end is peened over after the rivet has been inserted in a preformed hole. Additionally, some nails have been provided with bifurcated shanks in which the shanks spread apart when the nail is driven into a relatively soft somewhat resilient base material such as wood or the like.

Some prior art structures, such as the patent to Anderson 1,349,183, have included a hollow tubular pin or shank which is adapted to be driven into a wood base material and the penetrating end of the pin is of a configuration to deform slightly to prevent easy withdrawal. However, structures of this type which are to be driven into wood normally include a sharp cutting edge which severs the fibers of the wood.

The prior art patent to Walker U.S. Pat. No. 3,699,636 discloses a hard metallic tubular member the penetrating end of which is provided with a pair of tapered chamfer portions so that the tubular member may be driven into a softer base material to cause the base material to be deformed while the penetrating portion retains its original configuration.

Also some prior art nails such as the patent to Hermle U.S. Pat. No. 3,555,957 have been provided with a hardened penetrating point which could be driven into a hard dense metallic base material by means of an explosive charge. However, the penetrating portion of the fastener is not intended to deform as it is driven.

Some fasteners, such as my U.S. Pat. Nos. 3,871,264 and 4,004,483, have been provided that can be driven into a hard dense metallic structural member in which the penetrating portion of the fastener is harder than the base material and is of a configuration such that the penetrating portion of the fastener retains its shape while portions of the base material are adapted to be deformed into recesses in the fastener for locking the fastener to the base material.

Success was obtained with clinch type fasteners which could be driven into relatively soft sheet metal or the like as disclosed in my prior U.S. Pat. Nos. 3,095,777 and 4,003,286, but in the absence of certain critical parameters, there was no evidence that they would function properly in hardened structural steel. The disclosure in my U.S. Pat. No. 3,095,777 included several embodiments, however, the main thrust of the disclosure was toward driving the fastener into relatively soft sheet metal. The flow characteristics of relatively soft sheet metal are substantially different from the flow characteristics of relatively hard, thick structural metal since material which is displaced in sheet metal tends to flow downwardly and toward the side, while the displaced material of the structural metal tends to flow upwardly. When the sheet metal rests on an anvil, the metal tends to flow toward the side only. Accordingly the physical dimensions of a fastener for driving into sheet metal are not as critical as the dimensions of a fastener for driving into hard structural metal. For example, it has been determined that the width of the blunt point has a direct relationship with the diameter of the bore, that the hardness of the penetrating end has a direct relationship with the hardness of the metallic structure, and that the pressure on the penetrating end of the fastener is substantially greater when the fastener is driven into a structural metallic member than when driven into sheet metal.

SUMMARY OF THE INVENTION

The present invention is embodied in a clinch type nail including a shank having a hollow generally frusto-conical penetrating portion with a blunt end and such penetrating portion tapers axially inwardly at an included angle of approximately 30°. A generally cylindrical or slightly frusto-conical recess extends axially inwardly from the blunt end of the nail and the edge of such recess is spaced laterally inwardly from the edge of the tapered portion to define a continuous substantially flat ring of predetermined width. The penetrating portion of the nail is heat treated to a hardness which is greater than the hardness of a structural metallic member into which the nail is to be driven so that the penetrating portion of the fastener will penetrate the metallic member. Due to the configuration of the penetrating portion of the fastener and the mass of the structural metallic member, the penetrating portion deforms when driven and clinches inwardly to capture a plug of material in the hollow recess, while such plug of material remains connected to the base material.

It is an object of the invention to provide a fastener including a hollow generally frusto-conical penetrating portion at one end which has a predetermined taper and terminates in a blunt end and such blunt end is provided with a recess the edges of which are spaced a predetermined distance from the frusto-conical portion and define a continuous ring having a width which is approximately 1/10 of the diameter of the bore. Such penetrating portion is hardened to a hardness which is at least 40 Rockwell points greater than the hardness of a structural metallic member but soft enough to deform slightly when driven into the structural metallic base material and clinch a plug of such material to resist withdrawal of the fastener.

DESCRIPTION OF THE PREFERRED EMBODIMENTS

Figure 1:
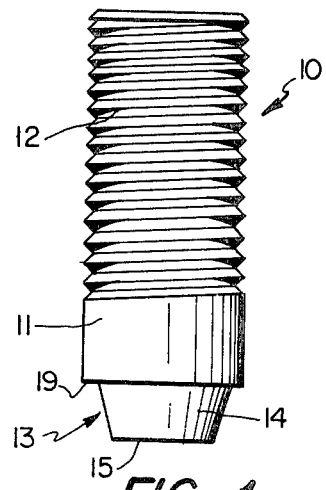
FIG. 1 is a side elevation illustrating one embodiment of the invention.
Figure 2:
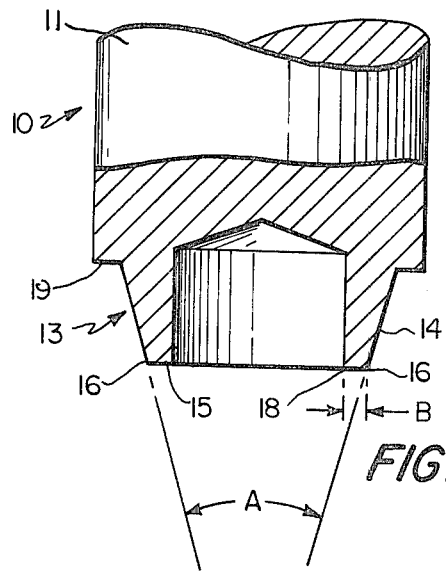
FIG. 2 is an enlarged sectional view of the penetrating end thereof.
Figure 3:
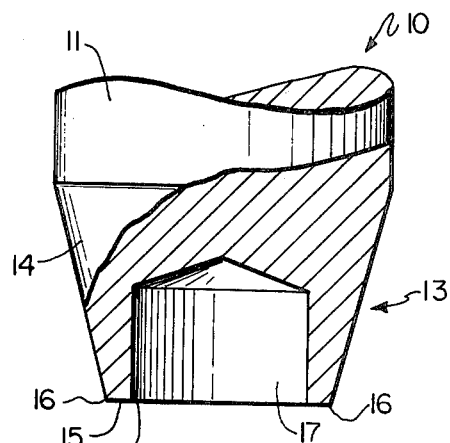
FIG. 3 is an enlarged sectional view of the penetrating end of the preferred embodiment.
Figure 4:
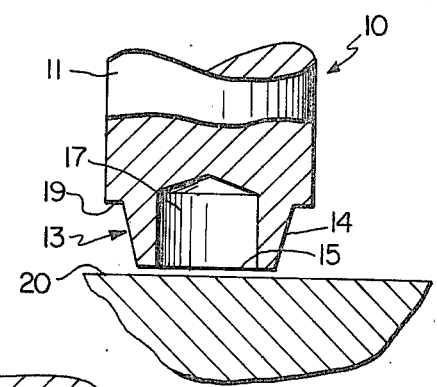
FIG. 4 is a sectional view illustrating the configuration of the penetrating portion of FIG. 1 immediately prior to being driven.

With continued reference to the drawing, a fastener 10 is provided having a generally cylindrical shank or body 11 which may include threads 12 extending at least part of the length thereof. The fastener has a generally frusto-conical penetrating portion 13 at one end of the shank and such penetrating portion includes an outer wall 14 which tapers at a constant angle from a predetermined diameter at the end of the shank to a smaller diameter remote from the shank. The penetrating portion 13 terminates in a blunt or flat generally circular end 15 which joins the outer wall 14 at a sharp edge 16. A generally cylindrical recess or bore 17 (FIGS. 1–4) extends inwardly from the flat end 15 and the edge 18 of such bore is spaced concentrically inwardly from the edge 16 by a predetermined amount and defines a continuous substantially flat ring. With particular reference to FIGS. 1 and 2, the penetrating portion 13 is spaced inwardly from the periphery of the shank 11 and defines a shoulder 19. With reference to FIG. 3, the penetrating portion 13 extends upwardly to a line of intersection with the shank 11.

The outer wall of the frusto-conical penetrating portion 13 tapers from a larger diameter at the shank 11 to a smaller diameter at the end 15 at an included angle A which is in the range of 28° to 34° and preferably is 30°. The edge 18 of the bore 17 is spaced concentrically inwardly from the edge 16 of the frusto-conical portion a distance B such that the blunt end or ring 15 has a width which ranges from 0.003 inch when the diameter of the bore is approximately 0.030 inch to a width of 0.015 inch when the diameter of the bore is approximately 0.150 inch. Preferably the ring has a width of approximately 0.007 inch to 0.014 inch when the diameter of the bore is approximately 0.080 inch and the shank 11 has a diameter of approximately 0.135 inch. In other words, the width of the ring 15 should be approximately 1/10 the diameter of the bore 17. The hardness of most structural steel beams and the like normally is approximately Rockwell B50 to B90 and therefore the penetrating portion 13 of the fastener is heat treated to a hardness in the range of Rockwell C52 to C57 and preferably to a hardness of Rockwell C54. If the fastener is to be driven into other structural members (including aluminum members) approximately the same ratio of hardnesses should apply.

Figure 7:
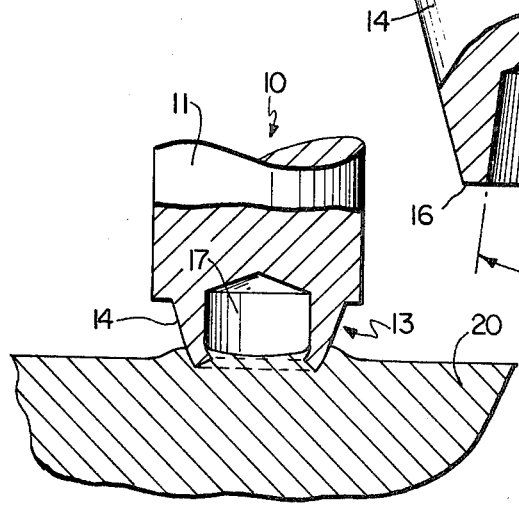
FIG. 7 is an enlarged sectional view similar to FIG. 3 illustrating another embodiment of the invention.
Figure 5:
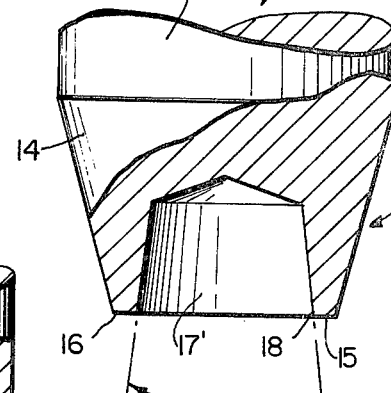
FIG. 5 is a sectional view similar to FIG. 4 illustrating the penetrating portion partially engaging the structural metallic member.

With particular reference to FIG. 7 a recess 17' may be provided having a frusto-conical or slightly tapered configuration which includes a predetermined diameter at the circular end 15 and a constantly decreasing diameter toward the shank. Such frusto-conical recess preferably is formed at an included angle C of approximately 4° relative to the longitudinal axis of the fastener. In this embodiment, the flat generally circular end 15 and the sharp edges 16 and 18 remain substantially the same as previously described.

In the operation of the device, when it is desired to attach a fastener 10 to a relatively thick structural steel member 20 having a hardness of approximately Rockwell B70, the fastener is driven with a conventional driver (not shown) such as a hand held hammer, fluid operated hammer or the like, so that the driver applies an axial force to the fastener to drive the penetrating portion 13 into the structural steel member. During initial penetration, the metal of the structural member that is displaced by the penetrating portion follows the course of least resistance which is toward the surface into which the fastener is being driven. Due to the configuration of the penetrating portion, a plug of material 21 is cut by the sharp edge 18 between the blunt end 15 and the recess 17 or 17' and such plug enters the recess.

During penetration a substantial pressure is applied to the tapered outer wall 14 of the penetrating portion 13 by the resistance to penetration of the mass of the structural steel member and such force causes the blunt end or ring 15 to constrict substantially equally around the entire periphery so as to clinch the penetrating end of the fastener around the plug of material within the recess. However, since the penetrating end of the fastener is harder than the structural steel member, the blunt end 15 does not constrict enough to close the recess and therefore the plug of material remains connected by a reduced neck 22 to the remainder of the structural steel member.

The relationship between the width of the blunt end and the diameter of the recess 17 or 17' adjacent to such blunt end is critical since a width of substantially less than 1/10 of the diameter of the recess has a tendency to cause the end of the penetrating portion to collapse on impact which not only resists penetration but also a tendency to break the penetrating end of the fastener. If the width of the blunt end is substantially greater than 1/10 of the diameter of the recess, the penetrating end is too stiff or strong so that the penetrating portion is driven straight in and does not deform. If the penetrating portion does not deform, the fastener may be easily withdrawn from the structural steel member.

Figure 6:
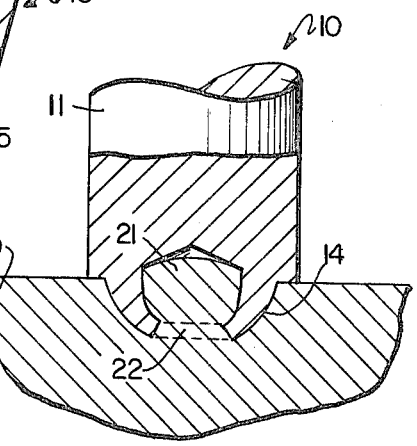
FIG. 6 is a sectional view similar to FIG. 4 illustrating the penetrating portion in clinched condition.

Normally a fastener having a penetrating end similar to FIG. 3 or FIG. 7 penetrates the structural steel member to a depth such that bend-out is not a significant problem. However, in cases where bend-out may be a problem, or in cases where it is important that the fastener extend a predetermined distance from the surface of the structural member, the fastener may be provided with a shoulder or stop 19 as illustrated in FIG. 2, and such fastener may be driven into the structural steel member to the point where the shoulder or stop engages the upper surface of the structural member, as illustrated in FIG. 6. When this occurs the shoulder 19 also resists bend-out of the fastener in all non-axial directions.

I claim:

1. A clinch type fastener for driving in and attached to a metallic member comprising a body having a penetrating portion at one end, said penetrating portion including an outwardly extending generally frusto-conical outer wall which tapers from a predetermined diameter adjacent to said body to a smaller diameter remote therefrom at an included angle of at least 28° and not more than 34°, a recess including an inner wall extending axially inwardly from the outer end of said penetrating portion, the outer end of said recess having a predetermined diameter and being generally concentric with the end of said outer wall and defining a blunt continuous generally circular ring at the outer end of said penetrating portion, said ring having a substantially constant width of approximately 1/10 of the diameter of said outer end of said recess, and said penetrating portion being heat treated to a hardness greater than the hardness of the metallic member, whereby when the fastener is driven into the metallic member said penetrating portion penetrates the metallic member and such penetration causes said continuous ring to clinch inwardly around its entire periphery and capture a portion of a plug of material within the recess.

2. The structure of claim 1 in which the included angle of said outer wall is approximately 30°.

3. The structure of claim 1 in which said recess has a diameter of approximately 0.080 inch and said ring has a width of approximately 0.007 inch to 0.014 inch.

4. The structure of claim 1 in which said penetrating portion is heat treated to a hardness of Rockwell C52 to C57.

5. The structure of claim 4 in which said penetrating portion is heat treated to a hardness of Rockwell C54.

6. The structure of claim 1 in which said inner wall of said recess is generally cylindrical.

7. The structure of claim 1 in which said inner wall of said recess is of frusto-conical configuration having an included angle of not more than 4° from the axis of said body and decreasing inwardly from the outer end of said penetrating portion toward said body.

8. The structure of claim 1 including an annular shoulder located adjacent to one end of said outer wall to limit penetration of said penetrating portion and to resist bend-out of said fastener in non-axial directions.

9. A clinch type fastener for driving in and attaching to a steel member comprising a generally cylindrical shank having a penetrating portion at one end, said penetrating portion including a generally frusto-conical outer wall which tapers outwardly from the end of said shank toward the axis thereof at an included angle of approximately 30°, a recess including an inner wall extending inwardly from the outer end of said penetrating portion, the outer end of said recess having a predetermined diameter and being concentric with the outer end of said outer wall and defining a continuous flat substantially circular ring at the outer end of said penetrating portion, said ring having a width of approximately 1/10 of the diameter of the outer end of said recess, said ring being connected to said outer wall and said inner wall by sharp edges, and said penetrating portion being heat treated to a hardness of substantially Rockwell C54, whereby when the fastener is driven into a steel member having a hardness in the range of Rockwell B45 to B95 said penetrating portion penetrates the steel member so that a plug of steel is cut from the member and enters said recess and the penetrating force acting on said frusto-conical outer wall causes said continuous ring to clinch inwardly around the plug of material to resist withdrawal of the fastener.

10. The structure of claim 9 including an annular shoulder at one end of said shank to limit penetration of said penetrating portion and to resist bend-out of said fastener.

* * * * *